United States Patent [19]

Gerarts et al.

[11] Patent Number: 4,498,527
[45] Date of Patent: Feb. 12, 1985

[54] HEAT-EXCHANGING ROLLER

[75] Inventors: Wilhelm Gerarts; Gerd Thielen, both of Krefeld; Eberhard Derichs, Steinrath 10, D-4150 Krefeld, all of Fed. Rep. of Germany

[73] Assignee: Eberhard Derichs, Krefeld, Fed. Rep. of Germany

[21] Appl. No.: 314,967

[22] Filed: Oct. 26, 1981

[30] Foreign Application Priority Data

Oct. 25, 1980 [DE] Fed. Rep. of Germany ....... 3040359

[51] Int. Cl.³ .......................... F28D 11/02; F28F 5/02; B60B 7/06
[52] U.S. Cl. ........................................ 165/89; 165/76; 34/119; 29/110; 29/117; 29/123; 29/129
[58] Field of Search ............... 165/89, 90, 76; 34/117, 34/119; 29/110, 123, 129, 117

[56] References Cited

U.S. PATENT DOCUMENTS

| 3,228,462 | 1/1966 | Smith, Jr. | 165/89 |
| 3,355,817 | 12/1967 | Birk | 165/89 X |
| 3,406,748 | 10/1968 | Jarreby | 165/89 |
| 3,631,917 | 1/1972 | Lorton | 165/89 |
| 3,887,250 | 6/1975 | Fleissnel | 165/89 X |
| 4,050,510 | 9/1977 | Theysohn | 165/89 |
| 4,077,466 | 3/1978 | Fleissner | 165/89 |
| 4,229,950 | 10/1980 | Fessenden | 29/129 |
| 4,235,002 | 11/1980 | Pav et al. | 165/89 |
| 4,299,018 | 11/1981 | Bickerstaff et al. | 29/129 |

FOREIGN PATENT DOCUMENTS

| 1132323 | 6/1962 | Fed. Rep. of Germany | 165/89 |
| 0215887 | 6/1961 | Netherlands | 29/117 |
| 1076499 | 7/1967 | United Kingdom | 29/110 |

Primary Examiner—William R. Cline
Assistant Examiner—John K. Ford
Attorney, Agent, or Firm—Shlesinger, Arkwright, Garvey & Fado

[57] ABSTRACT

A heat exchanging roller has an inner and an outer generally cylindrical casing with an annular space defined between them through which the heat exchanging medium passes. Sealing rings are disposed at the ends of the roller and bound the annular space. Sets of clamping mechanisms connect the sealing rings to the casing. Each clamping mechanism consists of two single conical lock washers, a double conical clamping ring and tightening screws which are threaded into associated boreholes in the sealing rings. The sealing rings are designed as centering rings of which the radial circumferential surfaces cooperate with the associated centering surfaces on the inner and outer casing. The circumferential surfaces each include at least one groove for receiving a resilient seal.

6 Claims, 2 Drawing Figures

HEAT-EXCHANGING ROLLER

The invention concerns a roller with an outer and inner casing and an annular space defined between them through which passes a heat-exchanging medium and which is bounded at the roller ends by sealing rings forming support means for sets of clamping means each consisting of two single conical lock-washers, a double conical clamping ring and tightening screws set in associated threaded boreholes of the sealing rings.

In a known roller of the described species (German Pat. No. 15 75 639), the sealing rings of the clamping sets of a multi-part design, namely they consist of a ring of an elastic material sealing the outer and inner casings and of a solid ring resting on said elastic ring and comprising the threaded boreholes for the tightening screws. Also, as regards the known designs, the clamping sets are not only meant to transmit forces or torques between the outer and inner casings, rather their purpose additionally is to center the outer casing with respect to the inner casing. This is to be implemented by different adjustments of the tightening screws. However, as it is difficult to precisely manufacture the single conical lockwashers and the double conical clamping ring to the precise desired conicity, and as there always are tolerances, for instance as regards the essentially cylindrical support surfaces between the lockwashers and the surfaces of the roller, a precise concentricity of the roller, i.e. its outer casing as a rule cannot be obtained due to the error addition in the deviations from the various tolerances. On the other hand where large roller diameters beyond about 500 mm are concerned, the rollers of said species are required to evince precise concentricity. Another drawback of the known design is that the outer casing and the inner casing are only held together in a shape-locking, compressed manner; if there are adverse loads, relative shifts between the outer and inner casings may take place, or the outer casing may slip off the core-forming inner casing.

It is therefore the object of this invention to so improve a roller of the initially cited species that regardless of manufacturing tolerances, in particular those of the clamping sets, accurate concentricity shall be obtained.

This problem is solved in that the sealing rings are designed as centering rings of which the radial circumferential surfaces cooperate with associated centering surfaces at the inside of the outer casing and at the outside of the inner casing, and in that the circumferential surfaces each comprise at least one groove of revolution for the sealing ring arranged therein.

The roller of the invention separates the transmission of forces or torques from the centering process. The two roller casings are centered by centering rings mounted to the roller ends and which also can be secured to the outer or inner casings. The centering rings may be provided with a sufficiently large outer or inner circumferential surface with which are associated centering surfaces at the inside circumference of the outer casing and at the outer circumference of the inner casing. These surfaces can be obtained in a simple manner and with high accuracy, whereby the outer and inner casings of the roller will be precisely centered with respect to each other after assembly.

The centering rings moreover assume the function of sealing rings because they comprise grooves of revolution at the outer and the inner circumferential surface for the purpose of seating sealing rings which perform their sealing functions in cooperation with the associated centering surfaces of the outer and inner casings.

The clamping sets can be adjusted or tightened henceforth with respect to the desired transmission of forces or torques between the inner and outer casings. Special consideration of the centering between the outer and inner casings is not needed in this regard. Thereby assembly is simplified.

The centering rings can be secured by means of an axial support surface arranged next to the centering surface on the side of the ring and for the purpose of supporting the associated centering ring, and by a lockwasher to secure the centering ring mounted outside the associated centering surface in an associated groove. Thereby the particular centering ring will be axially fixed and fastened to the outer or inner casing. Because the lockwasher is located on the outside of the centering ring, such securing may also be carried out during the assembly.

In addition or in combination therewith, a step may be provided at the outer casing's side which is opposite the axial support surface, said step being offset with slight play in the axial direction of the annular space and acting as a stop means between this casing and the centering ring. In this instance the intent ultimately is to be secure against an axial displacement of the outer and inner casings relative to each other when the shape-locking, compressive connection of the clamping sets ceases.

An embodiment of the invention is explained below in relation to the drawing.

Figure 1:
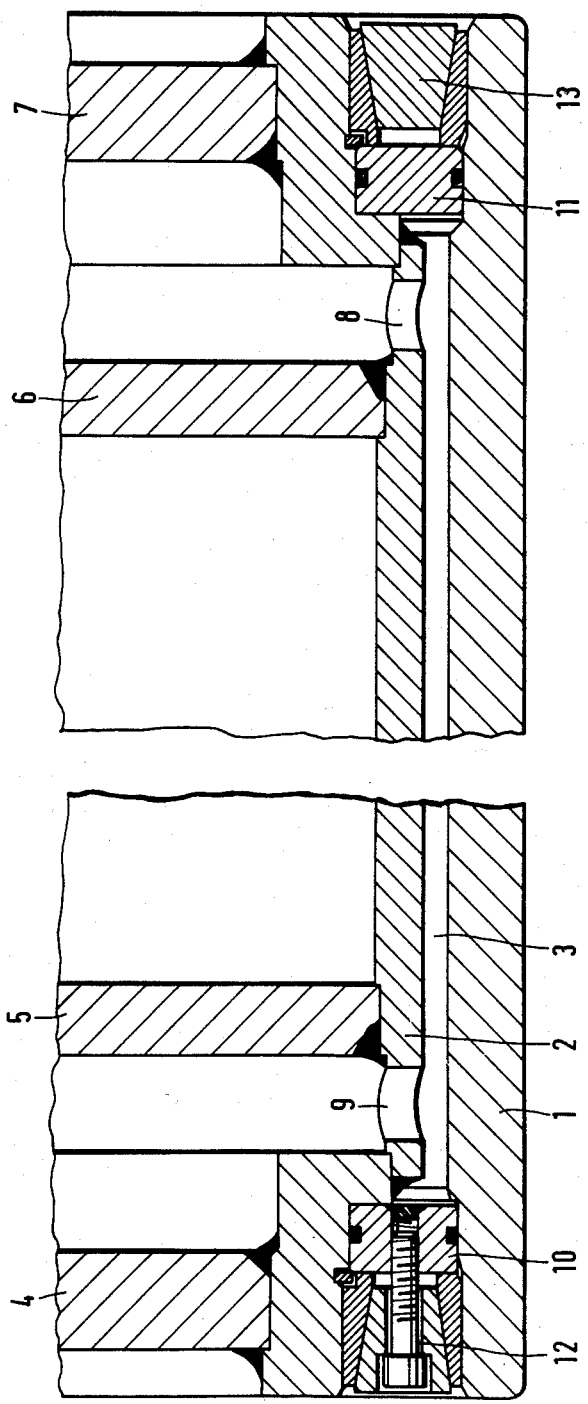
FIG. 1 is a partial axial section through a heat-exchanging roller.

The roller shown in the drawing in its basic design consists of an outer casing 1, an inner casing 2 and an annular space 3 bounded by said two casings. The inner casing 2 rests by means of disks 4, 5, 6, 7 -- which can be replaced at least in part by spokes, on an (omitted) shaft. A heat-exchanging medium enters the annular space 3 through one or more apertures 8 on one side of the inner casing 2, flows through this annular space 3 and possibly through a helical path formed by (omitted) integrated structures to reach the other side where it leaves the annular space 3 through one or more apertures 9.

The outer and inner casings 1 and 2 resp. are mutually centered by centering rings 10 and 11 resp. mounted in the area of the roller ends and are joined compressively in shape-locking manner by associated clamping sets 12 and 13 resp. The centering rings 10 and 11 and the clamping sets 12 and 13 are always each of identical design, so that it suffices to described only the arrangement at one roller end.

Figure 2:
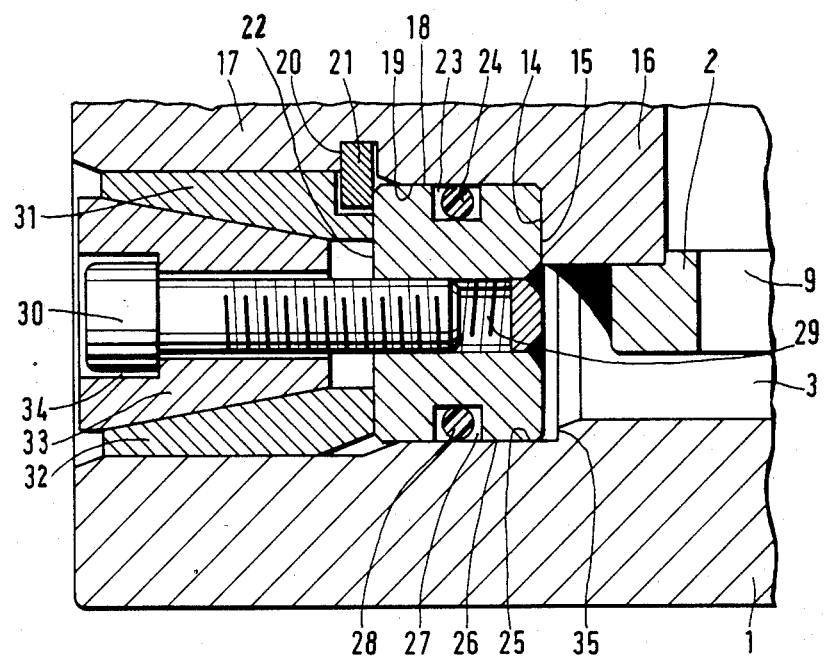
FIG. 2 shows on an enlarged scale the relative centering of the outer and inner casings of the roller of FIG. 1.

FIG. 2 shows the arrangement of the centering ring 10 and of the clamping set 12 on a larger scale. By means of its end face 14 toward the annular space, the centering ring 10 rests against an axial support surface 15 of the inner casing 2. This support means 15 is formed by a radial flange 16 joining the end of the inner casing 2 and followed by the axial flange 17 of which the inside surface next to the support area 15 is designed as the centering surface 18 for the inside surface of revolution 19 of the centering ring 10. A groove of revolution 20 is located on the outside next to the centering surface 18 and seats a lockwasher 21 projecting to the outside end face 22 of the centering ring 10 and thereby holding the centering ring 10 between the support surface 15 and the lockwasher 21. Also, the inside surface of revolution 19 of the centering ring 10 comprises a groove of revolution 23 to seat therein a sealing ring 24, which seals with the associated centering surface 18.

A centering surface 26 is associated with the outer circumferential surface 25 of the centering ring 10, the surface 25 being located on the outer casing 1 and sealing in conjunction with a sealing ring 28 located in a groove 27.

The sealing ring 10 comprises several threaded bores 29 arranged at mutual spacings on an arc of circle and receiving the tightening screws 30 of the clamping set 12. The clamping set 12 consists of two single conical lockwashers 31, 32 and of a double conical lockwasher 33. The cylindrical circumferential surface of the lockwasher 31 rests on the inside surface of the axial flange 17 joining the inner casing 2, whereas the cylindrical circumferential of the clamping ring 32 rest against an associated support surface of an inside of the outer casing 1. The conical surfaces of the lockwashers 31, 32 each face the double conical clamping ring 33 which is provided with stepwise offset bores 34 arrayed on an arc of circle for the purpose of receiving the clamping screws 30.

When the roller is assembled, first the outer casing 1 and the inner casing 2 are centered by slipping centering rings 10 and 11 from both roller ends between the outer casing 1 and the inner casing 2 and by inserting the lockwashers 21 into the associated grooves 20 for the purpose of securing said centering rings. Thereupon the components of the clamping sets 12 and 13 are moved in the array shown in front of the centering rings 10 and 11 resp. and the tightening screws 30 are screwed into the associated threaded boreholes 20 of the sealing rings 10 and 11 resp. until the desired compressive, shape-locking connection is obtained between the inner casing 2 and the outer casing 1.

The centering between the inner casing 1 and the outer casing 2 remains unaffected thereby. If during operation the compressive, shape-locking connection should loosen, a step 35 at the inside of the outer casing will prevent relative motion between the outer casing 1 and the inner casing 2, said step extending in the area of the end face 14 of the sealing ring 10 on the side of the annular space being offset with slight play with respect to the support surface 15 of the inside casing 2 in the direction of the annular space 3.

We claim:

1. An heat-exchanger roller, comprising:
   (a) an outer substantially cylindrical casing having spaced ends;
   (b) an inner substantially cylindrical casing having spaced ends, said inner casing ends generally aligned with said outer casing ends;
   (c) an annular space between said casings adapted for flow therethrough of an heat exchange medium;
   (d) each of said inner casing ends has a groove therein providing a radially extending support surface and an axially extending centering surface;
   (e) each of said outer casing ends has a groove therein providing an axially extending centering surface aligned with the associated inner casing centering surface;
   (f) another groove is disposed in said inner casing at each of said ends adjacent said inner casing centering surface and spaced from said associated support surface;
   (g) centering ring means bounding said annular space at each of said ends and are engaged with and supported by said inner casing centering surface and said support surface and said outer casing centering surface;
   (h) a lock washer is mounted in said another groove and is engaged with said centering ring means and holds said centering ring means against said support surface;
   (i) first and second spaced lock washer means are associated with said ends of each of said casings, each of said lock washer means is supported by one of said inner and outer casings;
   (j) each of said lock washer means has a conical surface thereof cooperating with and aligned with an associated conical surface of the adjacent lock washer means;
   (k) a double clamping ring is disposed between said first and second lock washers at each of said ends, said double conical clamping ring is engaged with and supported by said conical surfaces of said lock washer means; and,
   (l) screw means are associated with said clamping ring and engage said centering ring means for centering said inner and outer casings upon tightening of said screw means.

2. The roller as defined in claim 1, wherein:
   (a) said outer casing groove includes a radially extending step surface for preventing displacement of said centering ring means.

3. The roller as defined in claim 1, wherein:
   (a) a groove is disposed in said centering ring means adjacent one of said inner and outer casings; and,
   (b) resilient seal means are disposed in said centering ring means groove for sealing with said associated centering surface.

4. The roller as defined in claim 1, wherein:
   (a) a first and second groove is disposed in said centering ring means, each of said first and second grooves is associated with one of said inner and outer casings; and,
   (b) resilient seal means are disposed in each of said first and second grooves for sealing with the associated centering surfaces.

5. The roller as defined in claim 1, wherein:
   (a) a threaded bore is disposed in said centering ring means for engaging said screw means; and,
   (b) a counter-sunk bore is disposed in said clamping ring and aligned with said threaded bore and adapted for receiving said screw means therein.

6. The roller as defined in claim 1, wherein:
   (a) said first lock washer means has a recess therein adjacent said centering ring means for receiving therein a portion of said lock washer.

* * * * *